US009109643B2

(12) United States Patent  (10) Patent No.: US 9,109,643 B2
Eguchi  (45) Date of Patent: Aug. 18, 2015

(54) ACTUATOR FOR TWIN CLUTCH DEVICE

(71) Applicant: EXEDY Corporation, Neyagawa-shi, Osaka (JP)

(72) Inventor: Yasuhiko Eguchi, Neyagawa (JP)

(73) Assignee: EXEDY Corporation, Osaka (JP)

( * ) Notice: Subject to any disclaimer, the term of this patent is extended or adjusted under 35 U.S.C. 154(b) by 16 days.

(21) Appl. No.: 14/371,165

(22) PCT Filed: Feb. 15, 2013

(86) PCT No.: PCT/JP2013/053622
§ 371 (c)(1),
(2) Date: Jul. 8, 2014

(87) PCT Pub. No.: WO2013/122179
PCT Pub. Date: Aug. 22, 2013

(65) Prior Publication Data
US 2014/0346001 A1  Nov. 27, 2014

(30) Foreign Application Priority Data
Feb. 17, 2012  (JP) .................................. 2012-032418

(51) Int. Cl.
*F16D 27/08* (2006.01)
*F16D 28/00* (2006.01)
*F16D 21/06* (2006.01)
*F16D 21/02* (2006.01)
*F16D 23/12* (2006.01)

(52) U.S. Cl.
CPC .............. *F16D 28/00* (2013.01); *F16D 21/02* (2013.01); *F16D 21/06* (2013.01); *F16D 2021/063* (2013.01); *F16D 2021/0646* (2013.01); *F16D 2023/123* (2013.01)

(58) Field of Classification Search
CPC .............................. F16D 25/10; F16D 28/00
USPC ................ 192/48.2; 74/339, 340, 335; 477/5
See application file for complete search history.

(56) References Cited

U.S. PATENT DOCUMENTS

| 5,407,401 | A  | * | 4/1995 | Bullmer et al. | ............... | 477/110 |
| 5,603,672 | A  | * | 2/1997 | Zhang | ............. | 477/110 |
| 6,712,734 | B1 | * | 3/2004 | Loeffler | ............... | 477/5 |
| 6,941,830 | B2 | * | 9/2005 | Ibamoto et al. | ................. | 74/339 |

(Continued)

FOREIGN PATENT DOCUMENTS

| JP | 2004-263873 A | 9/2004 |
| JP | 2009-035255 A | 2/2009 |

(Continued)

*Primary Examiner* — David J Hlavka
(74) *Attorney, Agent, or Firm* — Global IP Counselors, LLP

(57) ABSTRACT

An actuator for a twin clutch device includes a single electric motor, first and second drive mechanisms, first and second transmission mechanisms, first and second hydraulic damper mechanisms and a control unit. Each first/second drive mechanism is configured to receive a first/second directional rotation from the electric motor and drive its respective first/second release member in a first operational direction. Each first/second transmission mechanism is configured to transmit only the first/second directional rotation from the electric motor to its respective first/second drive mechanism. Each first/second hydraulic damper mechanism is configured to regulate a moving speed of its respective first/second release member in a second operational direction opposite to the first operational direction. The control unit is configured to control the rotation of the electric motor.

4 Claims, 4 Drawing Sheets

(56) References Cited

U.S. PATENT DOCUMENTS

| | | | |
|---|---|---|---|
| 7,094,176 B2 * | 8/2006 | Budal et al. | 477/5 |
| 7,464,616 B2 * | 12/2008 | Leibbrandt et al. | 74/331 |
| 7,713,164 B2 * | 5/2010 | Silveri et al. | 477/5 |
| 8,251,865 B2 * | 8/2012 | Kaltenbach et al. | 477/5 |
| 8,584,543 B2 * | 11/2013 | Gitt | 74/331 |
| 8,701,517 B2 * | 4/2014 | Siebigteroth et al. | 74/340 |
| 2003/0019313 A1 | 1/2003 | Ibamoto et al. | |
| 2003/0074992 A1 * | 4/2003 | Gierling et al. | 74/335 |
| 2004/0231943 A1 | 11/2004 | Berger et al. | |
| 2005/0072256 A1 | 4/2005 | Ibamoto et al. | |
| 2006/0258506 A1 | 11/2006 | Ibamoto et al. | |
| 2007/0056823 A1 | 3/2007 | Ekonen et al. | |
| 2007/0056824 A1 | 3/2007 | Ekonen et al. | |
| 2010/0044181 A1 | 2/2010 | Ekonen et al. | |
| 2010/0219034 A1 | 9/2010 | Wheals et al. | |

FOREIGN PATENT DOCUMENTS

| | | |
|---|---|---|
| JP | 2009-510353 A | 3/2009 |
| JP | 2009-299738 A | 12/2009 |

\* cited by examiner

ACTUATOR FOR TWIN CLUTCH DEVICE

CROSS-REFERENCE TO RELATED APPLICATIONS

This application is a U.S. National stage application of International Application No. PCT/JP2013/053622, filed Feb. 15, 2013, which claims priority to Japanese Patent Application No. 2012-032418, filed in Japan on Feb. 17, 2012, the entire contents of which are hereby incorporated by reference.

BACKGROUND

1. Field of Invention

The present invention relates to an actuator for a twin clutch device, particularly to an actuator for operating first and second release members of a twin clutch device.

2. Background Information

A twin clutch device includes a first clutch for odd-numbered gear shifting and a second clutch for even-numbered gear shifting. Therefore, two release members are provided for operating the respective clutches.

The two release members are required to be operated independently from each other. Therefore, it is required to provide actuators corresponding to the respective release members. Each actuator includes a motor and an actuation mechanism mounted between the motor and its respective release member.

The well-known actuator for a twin clutch device as described above requires two motors, and this results in cost increase.

In view of the above, as described in Japanese Laid-open Patent Application Publication No. JP-A-2009-299738, a device has been provided that is configured to operate two release members with a single motor. The device described in Japanese Laid-open Patent Application Publication No. JP-A-2009-299738 includes two crank mechanisms, two freely movable members respectively configured to be moved in contact with the tip ends of sliders of the respective crank mechanisms, two transmission members respectively configured to transmit movement of the respective freely movable members to the release members, and a single motor configured to rotate the respective crank mechanisms.

SUMMARY

In the device described in Japanese Laid-open Patent Application Publication No. JP-A-2009-299738, the phase angles of respective crankshafts of the first and second crank mechanisms are set to be predetermined angles. The positional relation between the two sliders coupled to the respective crankshafts is fixed. Therefore, an operation pattern is inevitably fixed in gear shifting between the clutch for odd-numbered gear shifting and the clutch for even-numbered gear shifting. In such a structure, a shock can be produced in gear shifting.

It is an object of the present invention to enable an actuator for a twin clutch device to operate two release members with a single motor, and further, arbitrarily control an operation pattern in gear shifting.

An actuator for a twin clutch device according to a first aspect of the present invention is an actuator configured to operate a first release member and a second release member in the twin clutch device, and includes a single electric motor, a first drive mechanism, a second drive mechanism, a first transmission mechanism, a second transmission mechanism, a first speed regulation mechanism, a second speed regulation mechanism and a control unit. The first drive mechanism is configured to receive a first directional rotation from the electric motor and drive the first release member in a first operational direction. The second drive mechanism is configured to receive a second directional rotation from the electric motor and drive the second release member in the first operational direction. The first transmission mechanism is configured to transmit only the first directional rotation of the electric motor to the first drive mechanism. The second transmission mechanism is configured to transmit only the second directional rotation of the electric motor to the second drive mechanism. The first speed regulation mechanism is configured to regulate a moving speed of the first release member in a second operational direction opposite to the first operational direction. The second speed regulation mechanism is configured to regulate a moving speed of the second release member in the second operational direction. The control unit is configured to control the rotation of the electric motor.

In the actuator in accordance with the first aspect of the present invention, the first directional rotation of the electric motor is transmitted to the first drive mechanism through the first transmission mechanism. Further, the first release member is driven in the first operational direction by the first drive mechanism that has received the rotation from the electric motor. The first directional rotation of the electric motor is not transmitted to the second drive mechanism.

The second directional rotation of the electric motor is transmitted to the second drive mechanism through the second transmission mechanism. Further, the second release member is driven in the first operational direction by the second drive mechanism that has received the rotation from the electric motor. The second directional rotation of the electric motor is not transmitted to the first drive mechanism.

When the electric motor is being rotated, for instance, in the first direction in the actuation as described above, the second drive mechanism is not actuated. Therefore, the second release member, once moved in the first operational direction, attempts to return (attempts to move in the second operational direction). The moving speed of the second release member in the second operational direction is regulated by the second speed regulation mechanism. Therefore, an operation pattern in gear shifting can be arbitrarily controlled by the regulation of the moving speed by the second speed regulation mechanism and the control of the driving force of the first drive mechanism for driving the first release member (i.e., the control of the electric motor).

An actuator for a twin clutch device according to a second aspect of the present invention relates to the actuator of the first aspect, and wherein the first drive mechanism includes a first rotary shaft and a first drive member. The first drive member is movable in the first operational direction and the second operational direction by means of a rotation of the first rotary shaft, and is configured to drive the first release member in the first operational direction. Further, the second drive mechanism includes a second rotary shaft and a second drive member. The second drive member is movable in the first operational direction and the second operational direction by means of a rotation of the second rotary shaft, and is configured to drive the second release member in the first operational direction.

An actuator for a twin clutch device according to a third aspect of the present invention relates to the actuator of the first or second aspect, and wherein the first transmission mechanism includes a drive gear fixed to an output shaft of the electric motor, a first driven gear that is meshed with the drive gear and is mounted to the first rotary shaft, and a first one-way clutch disposed between the first driven gear and the first rotary shaft. Further, the second transmission mechanism includes the drive gear, a second driven gear that is meshed with the drive gear and is mounted to the second rotary shaft, and a second one-way clutch disposed between the second driven gear and the second rotary shaft.

In the actuator in accordance with the third aspect of the present invention, the first directional rotation of the electric motor is transmitted to the first driven gear through the drive gear fixed to the motor output shaft. The rotation of the first driven gear is transmitted to the first rotary shaft through the first one-way clutch. The rotation of the first rotary shaft is converted into movement of the first drive member in the first operational direction.

Further, the second directional rotation of the electric motor is transmitted to the second driven gear through the drive gear fixed to the motor output shaft. The rotation of the second driven gear is transmitted to the second rotary shaft through the second one-way clutch. The rotation of the second rotary shaft is converted into movement of the second drive member in the first operational direction.

In the aforementioned action, the first directional rotation of the electric motor is transmitted to the drive gear and the second driven gear, but is not transmitted to the second rotary shaft by the action of the second one-way clutch. Similarly, the second directional rotation of the electric motor is transmitted to the drive gear and the first driven gear, but is not transmitted to the first rotary shaft by the action of the first one-way clutch.

An actuator for a twin clutch device according to a fourth aspect of the present invention relates to the actuator according to any of the first to third aspects, and wherein the first speed regulation mechanism includes a first hydraulic damper mechanism configured to be actuated in conjunction with the first drive member. Further, the second speed regulation mechanism includes a second hydraulic damper mechanism configured to be actuated in conjunction with the second drive member.

An actuator for a twin clutch device according to a fifth aspect of the present invention relates to the actuator of the fourth aspect, and wherein the first hydraulic damper mechanism includes a first piston configured to be moved in conjunction with the first drive member, a first cylinder in which the first piston is accommodated, and a first orifice connected between an oil chamber of the first cylinder and a drain. Further, the second hydraulic damper mechanism includes a second piston configured to be moved in conjunction with the second drive member, a second cylinder in which the second piston is accommodated, and a second orifice connected between an oil chamber of the second cylinder and the drain.

According to the present invention as described above, the actuator for a twin clutch device can operate two release members with the single motor. Hence, it is possible to achieve a cost reduction. Further, it is possible to arbitrarily control the operation pattern in gear shifting.

DESCRIPTION OF EXEMPLARY EMBODIMENTS

Structure

Figure 1:
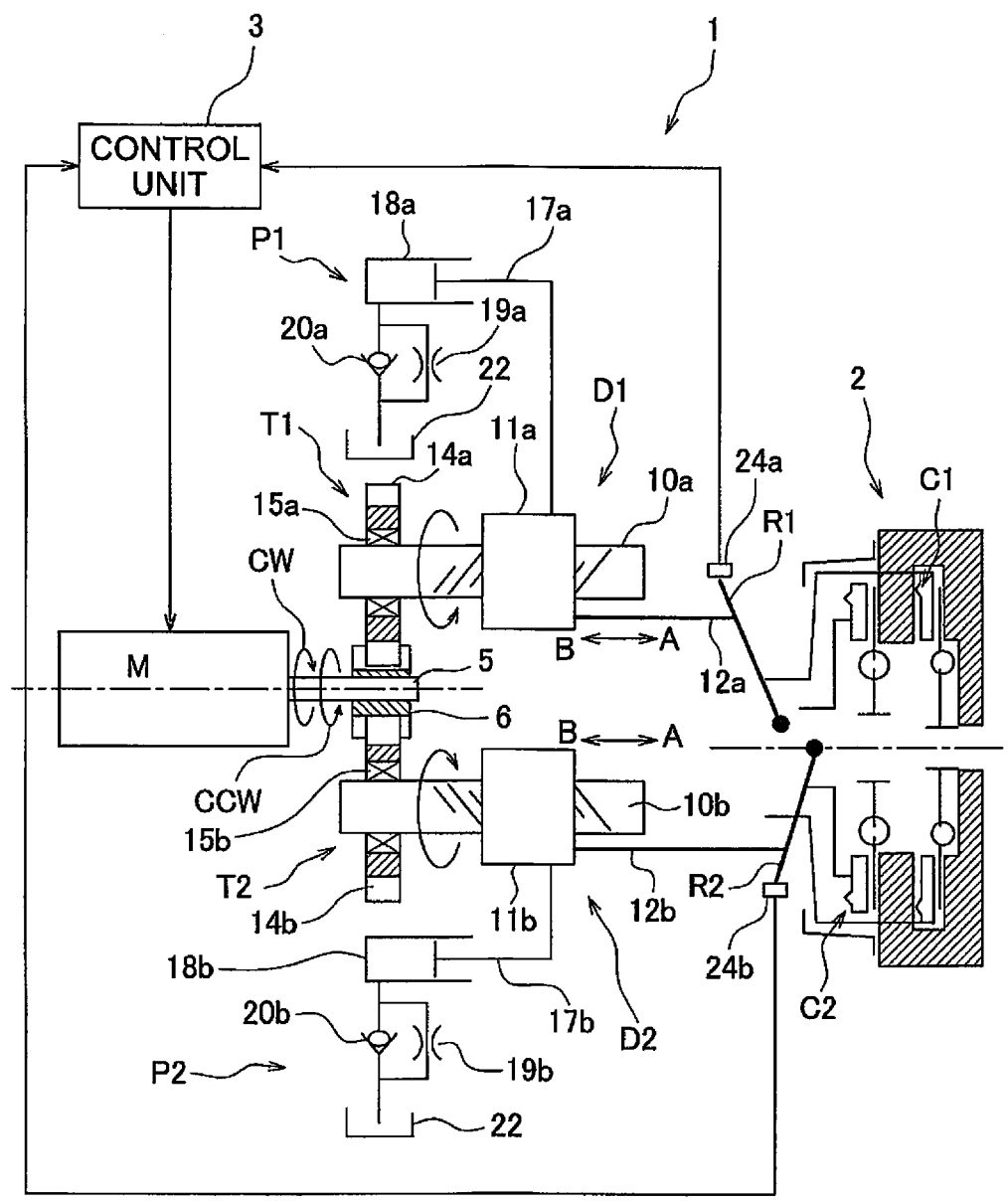
FIG. 1 is a configuration diagram of an actuator for a twin clutch device according to an exemplary embodiment of the present invention.

FIG. 1 represents a configuration of an actuator 1 for a twin clutch device according to an exemplary embodiment of the present invention. A twin clutch device 2 includes a first clutch C1 and a second clutch C2, and further, a first release member R1 and a second release member R2 that are respectively configured to couple (clutch-on; engage) or decouple (clutch-off; disengage) their respective clutches C1 and C2.

The first and second clutches C1 and C2, composing the twin clutch device 2, are set to be in a clutch-on state when their respective release members R1 and R2 are driven and operated in a first operational direction (an A direction in FIG. 1). When driving force applied to the respective release members R1 and R2 is then released, the respective release members R1 and R2 are returned in a second operational direction (a B direction in FIG. 1) by members composing the respective clutches C1 and C2. Accordingly, the respective clutches C1 and C2 are set to be in a clutch-off state.

The actuator 1 is a device for turning on/off the respective clutches C1 and C2 by operating their respective first and second release members R1 and R2. The actuator 1 includes a single electric motor M, first and second drive mechanisms D1 and D2, first and second transmission mechanisms T1 and T2, first and second hydraulic damper mechanisms P1 and P2 as speed regulation mechanisms, and a control unit 3.

The electric motor M is provided for driving the two drive mechanisms D1 and D2. The electric motor M is rotatable in a first direction (a clockwise direction, CW) and a second direction (a counterclockwise direction, CCW) opposite to the first direction. A drive gear 6 is fixed to an output shaft 5 of the electric motor M.

The first drive mechanism D1 is a mechanism configured to receive the first directional rotation from the electric motor M and drive the first release member R1 in the first operational direction A (to the rightward in FIG. 1). The first drive mechanism D1 is a ball screw mechanism, and includes a first screw shaft (a first rotary shaft) 10a and a first nut (a first drive member) 11a screwed onto the first screw shaft 10a through a plurality of balls.

With such structure, in conjunction with rotation of the first screw shaft 10a, the first nut 11a is movable in the first operational direction A along the rotational axis of the first screw shaft 10a. Further, the first nut 11a is also movable in the second operational direction B (to the left in FIG. 1) opposite to the first operational direction A along the rotational axis. Moreover, the first release member R1 is coupled to the first nut 11a through a coupling member 12a.

The second drive mechanism D2 is a mechanism configured to receive the second directional rotation from the electric motor M and drive the second release member R2 in the first operational direction A. Similarly to the first drive mechanism D1, the second drive mechanism D2 is a ball screw mechanism and includes a second screw shaft (a second rotary shaft) 10b and a second nut (a second drive member) 11b to be screwed onto the second screw shaft 10b through a plurality of balls.

With such structure, in conjunction with rotation of the second screw shaft 10b, the second nut 11b is movable in the first operational direction A along the rotational axis of the second screw shaft 10b. Further, the second nut 11b is also movable in the second operational direction B (to the left in FIG. 1) opposite to the first operational direction A along the rotational axis. Moreover, the second release member R2 is coupled to the second nut 11b through a coupling member 12b.

The first transmission mechanism T1 is a mechanism configured to transmit only the first directional rotation of the electric motor M to the first drive mechanism D1. The first transmission mechanism T1 includes the drive gear 6, a first driven gear 14a and a first one-way clutch 15a. The first driven gear 14a is supported by the first screw shaft 10a through the first one-way clutch 15a. The first one-way clutch 15a is configured to transmit only the second directional rotation of the first driven gear 14a (i.e., the first directional rotation of the electric motor M) to the first screw shaft 10a, while being configured not to transmit the reverse directional rotation to the first screw shaft 10a.

The second transmission mechanism T2 is a mechanism configured to transmit only the second directional rotation of the electric motor M to the second drive mechanism D2. The second transmission mechanism T2 includes the drive gear 6, a second driven gear 14b and a second one-way clutch 15b. The second driven gear 14b is supported by the second screw shaft 10b through the second one-way clutch 15b. The second one-way clutch 15b is configured to transmit only the first directional rotation of the second driven gear 14b (i.e., the second directional rotation of the electric motor M) to the second screw shaft 10b, while being configured not to transmit the reverse directional rotation to the second screw shaft 10b.

The first hydraulic damper mechanism P1 is a mechanism configured to regulate the speed of the first release member R1 moving in the second operational direction. The first hydraulic damper mechanism P1 includes a first piston 17a configured to be moved in conjunction with the first nut 11a, a first cylinder 18a in which the first piston 17a is accommodated, a first orifice 19a, and a first check valve 20a. The first orifice 19a and the first check valve 20a are connected between an oil chamber of the first cylinder 18a and a drain 22, while being connected in parallel to each other.

The second hydraulic damper mechanism P2 is a mechanism configured to regulate the speed of the second release member R2 moving in the second operational direction. The second hydraulic damper mechanism P2 includes a second piston 17b configured to be moved in conjunction with the second nut 11b, a second cylinder 18b in which the second piston 17b is accommodated, a second orifice 19b, and a second check valve 20b. The second orifice 19b and the second check valve 20b are connected between an oil chamber of the second cylinder 18b and the drain 22, while being connected in parallel to each other.

The control unit 3 is configured to control the rotation of the electric motor M. First and second position detection sensors 24a and 24b, respectively configured to detect the position of the first release member R1 and that of the second release member R2, are connected to the control unit 3. The control unit 3 has stored a map and so forth for determining which control signal should be outputted to the electric motor M in starting moving of a vehicle or in performing respective gear shift operations.

Actions

Figure 2:
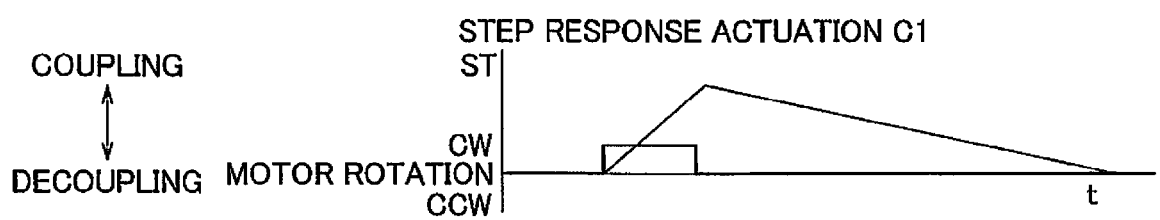
FIGS. 2(a) and 2(b) are graphs of the relations between rotation of an electric motor and strokes of release members.
Figure 2:
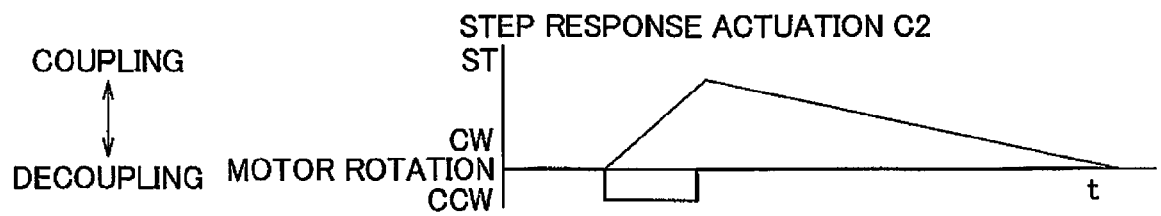

First, FIGS. 2(a) and 2(b) represent strokes (positions) of the respective release members R1 and R2 with respect to time, where a pulse signal as a drive signal is applied to the electric motor M. FIG. 2(a) represents a relation between time and stroke on the first clutch C1 (the first release member R1) side, whereas FIG. 2(b) represents a relation between time and stroke on the second clutch C2 (the second release member R2) side.

As is obvious from these diagrams, when a positive pulse signal is applied to the electric motor M, the electric motor M is rotated in the first direction (the clockwise direction). The rotation of the electric motor M is transmitted to the first screw shaft 10a through the drive gear 6, the first driven gear 14a and the first one-way clutch 15a. The first nut 11a is moved in the first operational direction A by the rotation of the first screw shaft 10a. Thus, the first release member R1 is also similarly moved in the first operational direction, i.e., to the "coupling" side. The first clutch C1 is thereby turned into the clutch-on state.

The first directional rotation of the electric motor M is transmitted to the second driven gear 14b, but is not transmitted to the second screw shaft 10b by the action of the second one-way clutch 15b.

By contrast, when a negative pulse signal is applied to the electric motor M, the electric motor M is rotated in the second direction (the counterclockwise direction), and the second transmission mechanism T2 and the second drive mechanism D2 are actuated similarly to the above. Further, the second release member R2 is moved to the "coupling" side and the second clutch C2 is turned into the clutch-on state.

When the driving of the electric motor M is stopped, each nut 11a, 11b and each release member R1, R2 are moved in the second operational direction, i.e., to the "decoupling" direction at a moving speed set by each orifice 19a, 19b of each first, second hydraulic damper mechanism P1, P2. The moving speed, i.e., a gradient of a characteristic after signal transmission to the electric motor M is stopped in FIGS. 2(a) and 2(b), can be controlled by changing the orifice diameter of each orifice 19a, 19b.

Figure 3:
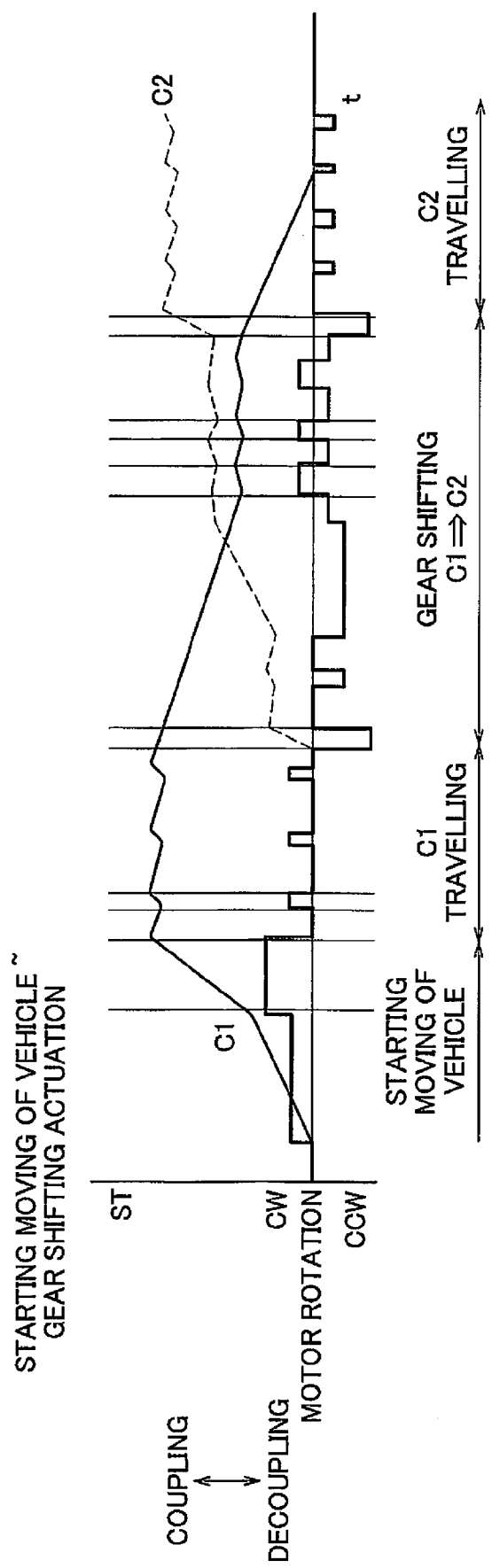
FIG. 3 is a graph of a relation between rotation of the electric motor and strokes of the release members in starting moving of a vehicle and a gear shift operation.

FIG. 3 represents a relation between exemplary pulse signals to be applied to the electric motor M and strokes of the respective release members R1 and R2, where a vehicle starts moving and then a gear shift operation is performed based on the aforementioned basic action. In FIG. 3, "C1," depicted with a solid line, indicates the stroke of the first release member R1, whereas "C2," depicted with a broken line, indicates the stroke of the second release member R2.

As represented in FIG. 3, a positive pulse signal is applied to the electric motor M to turn on the first clutch C1 in starting moving of a vehicle. Then, during travelling while the first clutch C1 is in the on-state, a positive pulse signal is applied to the electric motor M at predetermined cycles to maintain the on-state of the first clutch C1. Accordingly, the stroke of the first release member R1 is maintained at a predetermined stroke, while the first clutch C1 is maintained in the on-state.

Next, in gear shifting, a negative pulse signal is applied to the electric motor M to turn off the first clutch C1 and turn on the second clutch C2. The first release member R1 on the first-clutch-C1 side is gradually moved in the second operational direction by the first hydraulic damper mechanism P1. At this time, the width of the negative pulse signal to be applied to the electric motor M is regulated so as not to turn the second clutch C2 into the on-state while the first clutch C1 is reliably in the on-state.

In the latter part of gear shifting, a positive pulse signal and a negative pulse signal are alternately applied to the electric motor M, and the both clutches C1 and C2 are set in a half-clutch state. Accordingly, acute gear shifting can be avoided, and shock in gear shifting can be relieved.

Thereafter, only a negative pulse signal is applied to the electric motor M, while the first clutch C1 is being reliably turned off. Thus, the second clutch C2 is maintained in the clutch-on state.

Figure 4:
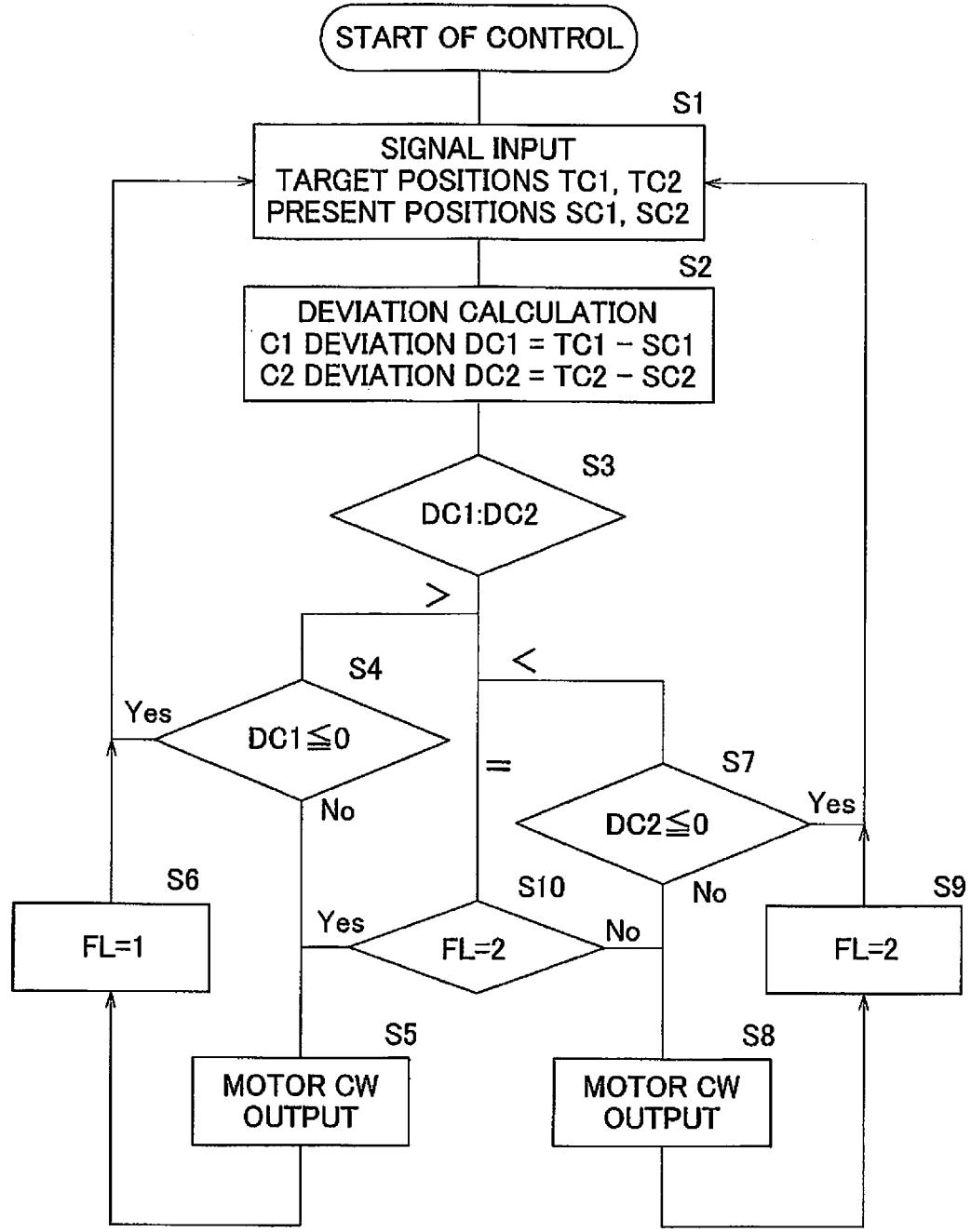
FIG. 4 is a control flowchart of the electric motor.

FIG. 4 represents a control flowchart of the electric motor M.

First in Step S1, target positions TC1 and TC2 of the respective release members R1 and R2, stored in the control unit 3, are retrieved while present positions SC1 and SC2 of the respective release members R1 and R2 are obtained based on detection signals from the first and second position detection sensors 24a and 24b. Next in Step S2, deviations are calculated. Specifically, a difference between the target position TC1 and the present position SC1 of the first release member R1 is calculated as a first deviation DC1 on the first-clutch-C1 side. On the other hand, a difference between the target position TC2 and the present position SC2 of the second release member R2 is calculated as a second deviation DC2 on the second-clutch-C2 side.

Next in Step S3, the first deviation DC1 and the second deviation DC2 are compared.

When the first deviation DC1 is greater, the processing proceeds from Step S3 to Step S4. In Step S4, it is determined whether or not the first deviation DC1 is less than or equal to "0". When the first deviation DC1 is less than or equal to "0", the processing returns to Step S1 and the aforementioned processing is repeatedly performed. By contrast, when the first deviation DC1 is "positive", this means that the first release member R1 has not reached the target position TC1, and hence, the processing proceeds from Step S4 to Step S5. In Step S5, a signal (a positive pulse signal) for rotating the electric motor M in the first direction (the clockwise direction) is outputted. Then in Step S6, a flag is set as "1" and the processing returns to Step S1.

On the other hand, in Step S3, when it is determined that the first deviation DC1 is less than the second deviation SC2, the processing proceeds from Step S3 to Step S7. In Step S7, it is determined whether or not the second deviation DC2 is less than or equal to "0". When the second deviation DC2 is less than or equal to "0", the processing returns to Step S1 and the aforementioned processing is repeatedly performed. By contrast, when the second deviation DC2 is "positive", this means that the second release member R2 has not reached the target position TC2, and hence, the processing proceeds from Step S7 to Step S8. In Step S8, a signal (a negative pulse signal) for rotating the electric motor M in the second direction (the counterclockwise direction) is outputted. Then in Step S9, the flag is set as "2" and the processing returns to Step S1.

Yet on the other hand, in Step S3, when the first deviation DC1 and the second deviation DC2 are equal to each other, the following processing is configured to be performed for alternately driving the first release member R1 and the second release member R2.

Specifically, the processing herein proceeds from Step S3 to Step S10. In Step S10, it is determined whether or not the flag has been set as "2". When the first release member R1 has been driven in the aforementioned processing, the flag has been set as "1" via Steps S5 and S6, and hence, determination in Step S10 results in "No". Therefore in this case, i.e., when the first release member R1 has been driven immediately before the present processing step, the processing proceeds from Step S10 to Step S8. Then in Step S8, as described above, a negative pulse signal is applied to the electric motor M, and the electric motor M is rotated in the second direction (the counterclockwise direction) to drive the second release member R2.

By contrast, when the second release member R2 has been driven in the aforementioned processing, the flag has been set as "2" via Steps S8 and S9, and hence, determination in Step S10 results in "Yes". Therefore in this case, i.e., when the second release member R2 has been driven immediately before the present processing step, the processing proceeds from Step S10 to Step S5. Then in Step S5, as described above, a positive pulse signal is applied to the electric motor M, and the electric motor M is rotated in the first direction (the clockwise direction) to drive the first release member R1.

Features

In the present exemplary embodiment as described above, the two release members R1 and R2 can be driven by the single electric motor M. Thus, the device cost can be suppressed low.

Further, the operation pattern in gear shifting can be arbitrarily controlled by the regulation of the moving speeds of the respective release members R1 and R2 by the respective hydraulic damper mechanisms P1 and P2 and the control of the electric motor M. Therefore, gear shift operations can be optimally performed in respective gear shifting situations, and shock can be inhibited in gear shifting.

Other Exemplary Embodiments

The present invention is not limited to the exemplary embodiment as described above, and a variety of changes or modifications can be made without departing from the scope of the present invention.

For example, the drive mechanism has been explained by exemplifying the ball screw mechanism. However, the drive mechanism is not limited to such mechanism. Further, the speed regulation mechanism has been explained by exemplifying the hydraulic damper mechanism. However, the speed regulation mechanism is not limited to such mechanism.

Further, the aforementioned exemplary embodiment has exemplified the mechanism configured to move the release member in the first operational direction to turn on the clutch. However, contrarily to this, the present invention is also similarly applicable to a mechanism configured to move the release member in the first operational direction to turn off the clutch.

The actuator for a twin clutch device according to the present invention can operate two release members with the single motor. Hence, it is possible to achieve a cost reduction. Further, it is possible to arbitrarily control the operation pattern in gear shifting.

The invention claimed is:

1. An actuator for a twin clutch device, the actuator being configured to operate a first release member and a second release member in the twin clutch device, the actuator comprising:

a single electric motor;

a first drive mechanism configured to receive a first directional rotation from the electric motor and drive the first release member in a first operational direction, the first drive mechanism including
a first rotary shaft; and
a first drive member movable in the first operational direction and the second operational direction by means of a rotation of the first rotary shaft, the first drive member being configured to drive the first release member in the first operational direction;

a second drive mechanism configured to receive a second directional rotation from the electric motor and drive the second release member in the first operational direction, the second drive mechanism including
a second rotary shaft; and
a second drive member movable in the first operational direction and the second operational direction by means of a rotation of the second rotary shaft, the second drive member being configured to drive the second release member in the first operational direction;

a first transmission mechanism configured to transmit only the first directional rotation of the electric motor to the first drive mechanism;

a second transmission mechanism configured to transmit only the second directional rotation of the electric motor to the second drive mechanism;

a first speed regulation mechanism configured to regulate a first moving speed of the first release member in a second operational direction opposite to the first operational direction;

a second speed regulation mechanism configured to regulate a second moving speed of the second release member in the second operational direction; and a control unit configured to control the rotation of the electric motor.

2. The actuator for a twin clutch device recited in claim 1, wherein the first transmission mechanism includes
a drive gear fixed to an output shaft of the electric motor;
a first driven gear meshed with the drive gear and mounted to the first rotary shaft; and
a first one-way clutch disposed between the first driven gear and the first rotary shaft, and the second transmission mechanism includes
the drive gear;
a second driven gear meshed with the drive gear and mounted to the second rotary shaft; and
a second one-way clutch disposed between the second driven gear and the second rotary shaft.

3. The actuator for a twin clutch device recited in claim 1, wherein the first speed regulation mechanism includes a first hydraulic damper mechanism configured to be actuated in conjunction with the first drive member, and the second speed regulation mechanism includes a second hydraulic damper mechanism configured to be actuated in conjunction with the second drive member.

4. The actuator for a twin clutch device recited in claim 3, wherein the first hydraulic damper mechanism includes
a first piston configured to be moved in conjunction with the first drive member;
a first cylinder in which the first piston is accommodated; and
a first orifice connected between an oil chamber of the first cylinder and a drain, and the second hydraulic damper mechanism includes
a second piston configured to be moved in conjunction with the second drive member;
a second cylinder in which the second piston is accommodated; and
a second orifice connected between an oil chamber of the second cylinder and the drain.

* * * * *